US010828561B2

(12) United States Patent
Lee

(10) Patent No.: US 10,828,561 B2
(45) Date of Patent: Nov. 10, 2020

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventor: Young Ho Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/180,539

(22) Filed: Nov. 5, 2018

(65) Prior Publication Data

US 2019/0134498 A1 May 9, 2019

(30) Foreign Application Priority Data

Nov. 6, 2017 (KR) .......................... 10-2017-0146613

(51) Int. Cl.
| *A63F 13/25* | (2014.01) |
| *G06T 7/536* | (2017.01) |
| *G06T 7/246* | (2017.01) |
| *G06F 3/14* | (2006.01) |
| *G06K 9/00* | (2006.01) |
| *G06K 9/46* | (2006.01) |

(52) U.S. Cl.
CPC .............. *A63F 13/25* (2014.09); *G06F 3/14* (2013.01); *G06K 9/00718* (2013.01); *G06K 9/46* (2013.01); *G06T 7/248* (2017.01); *G06T 7/536* (2017.01); *G06T 2207/10016* (2013.01); *G06T 2207/10028* (2013.01); *G09G 2320/0613* (2013.01)

(58) Field of Classification Search
CPC ...... A63F 13/25; A63F 13/80; A63F 2300/00; G06K 9/46; G06F 3/14; G06F 2207/10028; G06T 7/536
See application file for complete search history.

(56) References Cited

U.S. PATENT DOCUMENTS

| 2014/0101341 A1 | 4/2014 | Colenbrander |
| 2015/0258439 A1* | 9/2015 | Prosin ..................... A63F 13/00 463/31 |

FOREIGN PATENT DOCUMENTS

KR    10-2007-0005209    1/2007

OTHER PUBLICATIONS

Extended European Search Report in Application No. 18203950.3 dated Dec. 20, 2018 (7 pages).

* cited by examiner

*Primary Examiner* — Omkar A Deodhar
(74) *Attorney, Agent, or Firm* — Staas & Halsey LLP

(57) ABSTRACT

A display apparatus and a control method thereof that are configured to automatically change a display setting according to a genre of a game when the game is performed through the display apparatus. The display apparatus according to an embodiment includes a controller configured to receive image information on a game, derive feature information of the image including at least one of a motion and a depth of an object included in the image based on the received image, and determine a game genre for the image based on the derived feature information; and an image display unit configured to change the display setting of a screen being provided and provide the changed display setting, when the game genre for the image is determined.

20 Claims, 13 Drawing Sheets

VANISHING POINT DETECTION

VANISHING POINT AND HORIZONTAL LINE DETECTION

DISPLAY APPARATUS AND CONTROL METHOD THEREOF

CROSS-REFERENCE TO RELATED APPLICATION(S)

This application is based on and claims priority under 35 U.S.C. § 119 to Korean Patent Application No. 10-2017-0146613, filed on Nov. 6, 2017 in the Korean Intellectual Property Office, the disclosure of which is incorporated by reference herein in its entirety.

BACKGROUND

1. Field

The present disclosure relates to a display apparatus and a control method thereof that are adapted to automatically change a display setting according to the genre of a game when the game is performed through the display apparatus.

2. Description of the Related Art

A console game is a game performed on a screen by a combination of microchip and computer technology. The console game, also called a video game, refers to a game operated by connecting a dedicated game machine to the screen of a television or a monitor.

Conventional users have enjoyed games using a video game machine in a way that an individual or two game players play games alone or in a one-to-one manner via a television or a monitor. Recently, a large number of users can simultaneously enjoy games through a network such as the Internet.

The genres of games that may be enjoyed using the video game machine may be classified into a variety of categories such as a first-person shooter (FPS), a role playing game (RPG), a real-time strategy (RTS), and an aeon of stripe (AOS). It is necessary to apply an image and drive processing differently through genre detection because the characteristics of the images are different for each genre of the game.

SUMMARY

It is an aspect of the present disclosure to provide a display apparatus and a control method thereof that are configured to automatically change a display setting according to the genre of a game when the game is performed through the display apparatus.

Specifically, it is an aspect of the present disclosure to provide a display apparatus and a control method thereof that are adapted to automatically analyze the genre of a game based on image feature information including at least one of a motion of an object included in the image and a depth of the image and to change a display setting based on the analyzed result.

Additional aspects of the present disclosure will be set forth in part in the description which follows and, in part, will be obvious from the description, or may be learned by practice of the disclosure.

In accordance with one aspect of the present disclosure, there may be provided a display apparatus including: an input unit configured to receive a playback selection of game content; and a controller configured to receive image information on the game content according to the received playback selection, derive feature information of an image, the feature information including at least one of a motion and a depth of an object included in the image based on the received image information, determine the game genre for the image based on the derived feature information, change and provide a display setting of a screen being provided based on the determined game genre, and restore the changed display setting when the game content playback selection is canceled.

Further, the display apparatus may further include an image display unit configured to change the display setting of the screen being provided and provide the changed display setting, based on the determined game genre.

Further, the image display unit may be configured to change the screen, which is being provided, to a predetermined display setting for the determined game genre and provide the changed display setting.

Further, the controller may be configured to receive image information on game contents from a game console or an application stored in the display apparatus.

Further, the controller may be configured to determine the game genre for the images as the specific game genre when a feature of the images determined for a plurality of consecutively inputted images accords with a feature of the specific game genre for a preset time.

Further, the controller may be configured to determine the game genre for the images as a specific game genre when a feature of the images for a preset number of images among a plurality of consecutively inputted images accords with a feature of the image for the specific game genre.

Further, the image display unit may be configured to provide a window that induces to change the screen, which is being provided, to a predetermined display setting for the determined game genre and provide the changed display setting, when the game genre for the image is determined.

Further, the image display unit may be configured to display the game genre guidance for the game content being provided on the screen in an area of the screen.

Further, the controller may include: an image receiver configured to receive an image of game contents; a motion analyzer configured to analyze a motion of an object included in the image based on the received image; a depth detector configured to detect a depth of the received image; and a game genre determiner configured to determine the game genre for the image based on output values of the motion analyzer and the depth detector.

Further, the motion analyzer may include: a motion prediction unit configured to predict the degree and magnitude of motion of an object included in an image based on a plurality of consecutively inputted images; and a feature information derivation unit configured to derive feature information of the image based on the predicted motion information.

Further, the depth detector may be configured to detect a depth of the received image based on depth cues including at least one of geometric information, luminance information, frequency information, and histogram distribution information of the image, and derive feature information of an image including at least one of a vanishing point, a horizontal line, and a composition of an object.

Further, the game genre determiner may be configured to determine the game genre for the image based on feature information of the image including the direction and velocity information about an overall motion and a local motion of the image derived by the motion analyzer and feature information of the image including at least one of the vanishing point, the horizontal line, and the composition of an object detected by the depth detector.

Further, the display apparatus may further include a memory to store types of game genres and feature information of image for each type.

Further, the cancelling of the game content playback selection may include canceling the game content playback selection by at least one of when the input source of the game content is changed, when the power of the display apparatus is turned off, and when the setting for each genre of the game mode is canceled by the user.

In accordance with another aspect of the present disclosure, there may be provided a control method of a display apparatus including: receiving a playback selection of game content; receiving image information on the game content; deriving feature information of an image, the feature information including at least one of a motion and a depth of an object in the image based on the received image information; determining the game genre for the image based on the derived feature information of the image, and changing and providing a display setting of a screen being provided based on the determined game genre; and restoring the changed display setting when the game content playback selection is canceled.

Further, the changing and providing of the display setting of the screen being provided may include changing the screen, which is being provided, to a predetermined display setting for the determined game genre and providing the changed display setting.

Further, the receiving of the image information on the game content may include receiving image information on the game content from a game console or an application stored in the display apparatus.

Further, the determining of the game genre for the image based on a feature information of the image may include determining the game genre for the images as a specific game genre when a feature of the images determined for a plurality of consecutively inputted images accords with the feature of the specific game genre for a preset time or a feature of the images for a preset number of images among a plurality of consecutively inputted images accords with a feature of the image for the specific game genre.

Further, the control method may further include providing a window, when the game genre for the image is determined, that induces to change the screen, which is being provided, to a predetermined display setting for the determined game genre and provide the changed display setting; and displaying a game genre guidance for the game content being provided on the screen in an area of the screen.

Further, the cancelling of the game content playback selection may include canceling the game content playback selection by at least one of the case where the input source of the game content is changed, the case where the power of the display apparatus is turned off, and the case where the setting for each genre of the game mode is canceled by the user.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
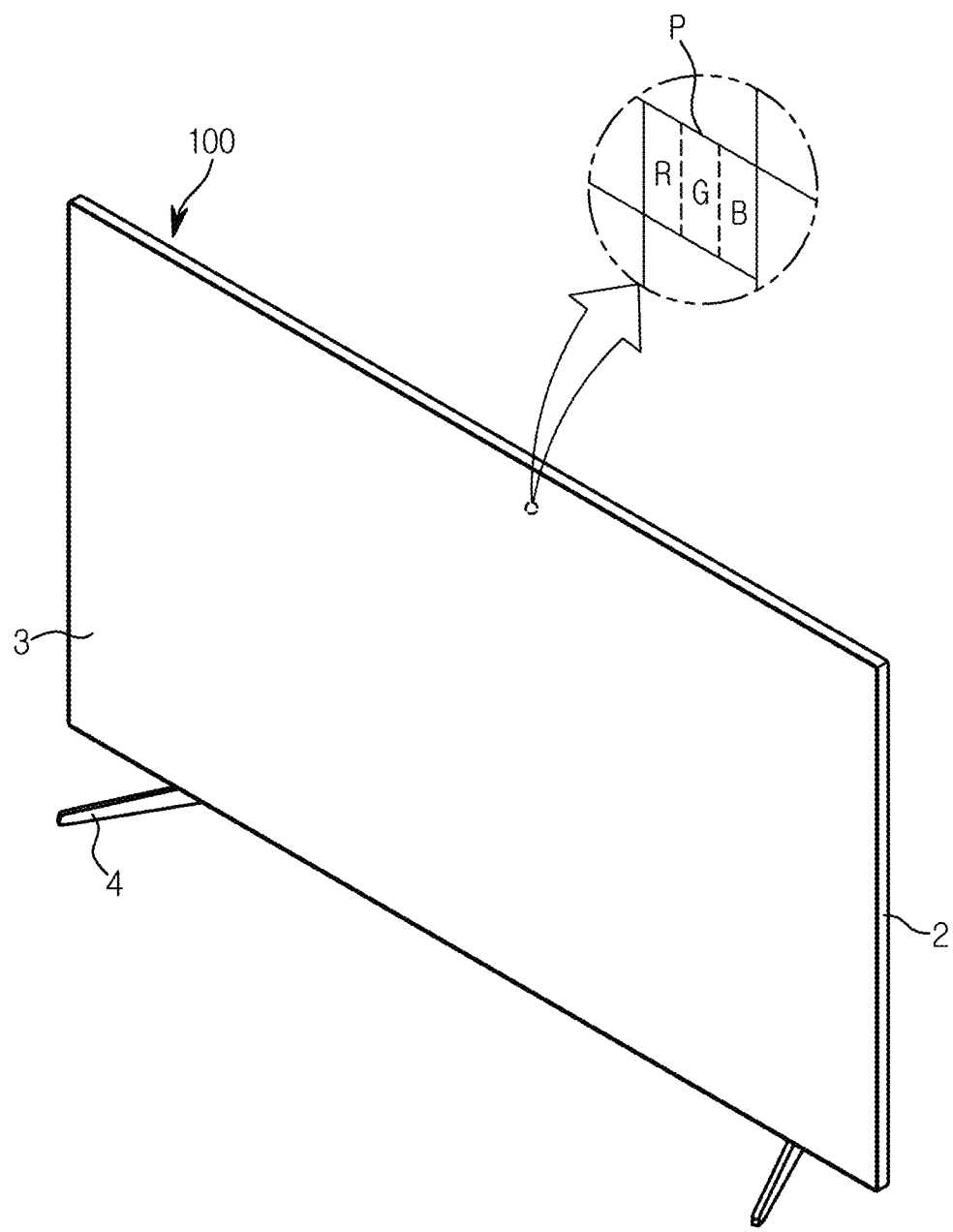
FIG. 1 is a perspective view of a display apparatus according to an embodiment of the present disclosure.

Like reference numerals refer to like elements throughout this specification. This specification does not describe all components of embodiments, and general information in the technical field to which the present disclosure belongs or overlapping information between the embodiments will not be described.

The terms "portion," "module," "member," and "block" as used herein, may be implemented as software or hardware, and according to embodiments, a plurality of "portions," "modules," "members," or "blocks" may be implemented as a single component, or a single "portion," "module," "member," or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it will be understood that the terms "includes," "comprises," "including," and/or "comprising," when used in this specification, specify the presence of a stated component, but do not preclude the presence or addition of one or more other components.

In the present specification, it will also be understood that when an element is referred to as being "on" or "over" another element, it may be directly on the other element or intervening elements may also be present.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations may be executed in a different order from the stated order unless a specific order is definitely specified in the context.

Hereinafter, the operation principle and embodiments of the present disclosure will be described with reference to the accompanying drawings.

Figure 2:
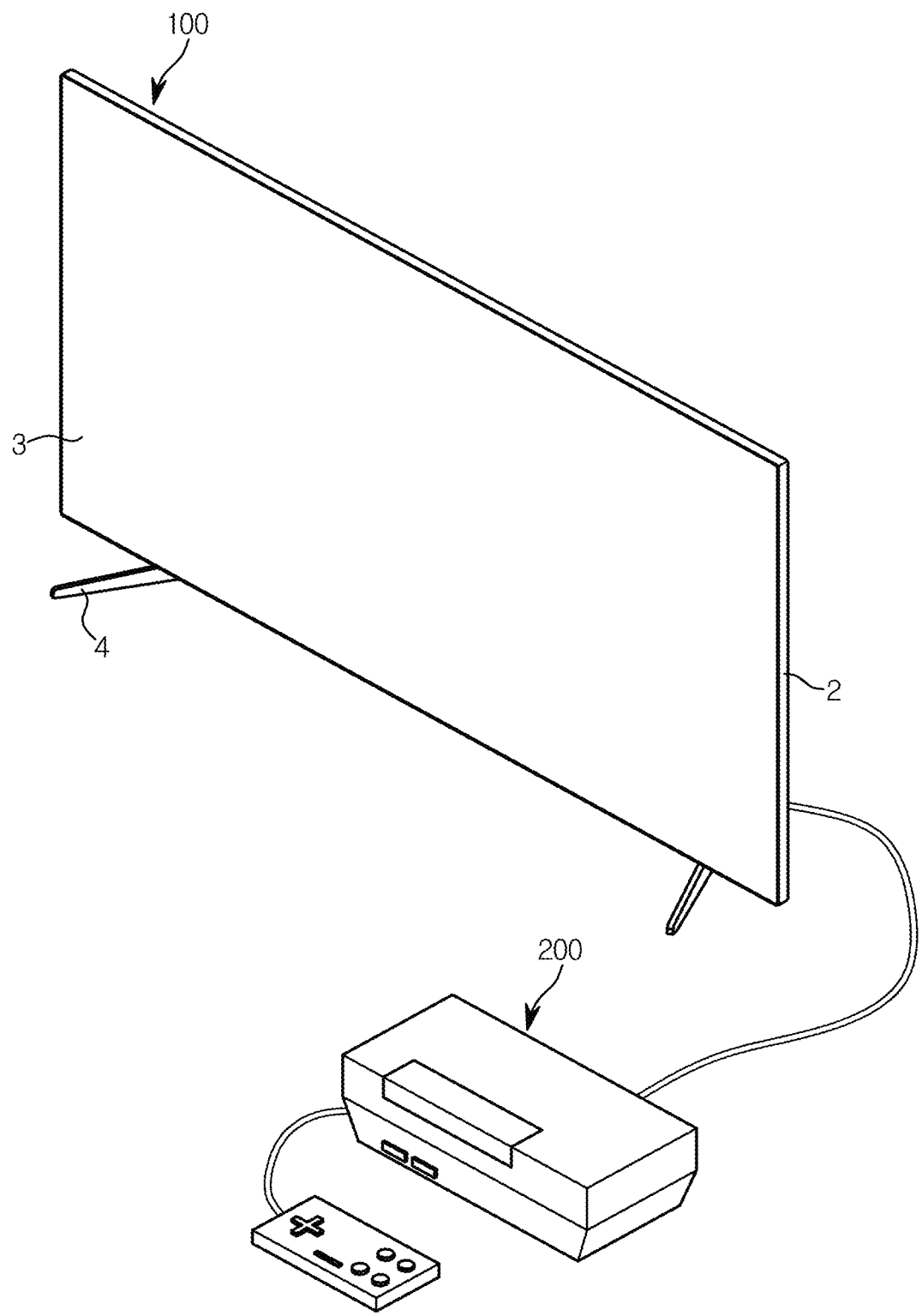
FIG. 2 is a view illustrating a state where a display apparatus according to an embodiment of the present disclosure is connected to a game console.

FIG. 1 is a view illustrating a display apparatus according to an embodiment of the present disclosure, and FIG. 2 is a view illustrating a state where a display apparatus according to an embodiment of the present disclosure is connected to a game console.

A display apparatus 100 is an apparatus that processes an image signal received from the outside and visually displays the processed image. Hereinafter, a case where the display apparatus 100 is a television (TV) is illustrated, but the type of the display apparatus 100 is not limited thereto. For example, the display apparatus 100 may be implemented in various forms such as a monitor, a portable multimedia apparatus, a portable communication apparatus, and a portable computing apparatus, and is not limited in its form as long as it is an apparatus capable of visually displaying an image.

The display apparatus 100 may receive video signals and audio signals from various content sources, and output video and audio corresponding to the video signals and audio signals. For example, the display apparatus 100 may receive television broadcast contents via a broadcast receiving antenna or a wired cable, receive contents from a content playback apparatus, receive contents from a content providing server of a content provider, or receive contents from a previously stored application or a downloaded application according to an embodiment.

The disclosure related to the display apparatus 100 in which display settings are automatically changed according to the genre of a game when the game is performed through the display apparatus 100. Hereinafter, for the sake of understanding, the display apparatus 100 will be described focusing on an example in which video and audio signals related to a game are received from various content sources with regard to the example in which the display apparatus 100 receives the video and audio signals from the various content sources.

First, when a game console 200 is not connected to the display apparatus 100 as shown in FIG. 1, the display apparatus 100 may receive game content from a content providing server of a game content provider, and may receive game contents from an application previously stored in the display apparatus 100 or a downloaded application. Herein, the game content is defined as a concept including video signals and audio signals associated with the game.

According to the embodiment, when the game console 200 is connected to the display apparatus 100 as shown in FIG. 2, the display apparatus 100 may receive the game contents stored in a memory of the game console 200. Even when the game console 200 is connected to the display apparatus 100, the display apparatus 100 may receive game contents from a content providing server of a game content provider, and may also receive game contents from an application previously stored in the display apparatus 100 or from a downloaded application.

As shown in FIGS. 1 and 2, the display apparatus 100 may include a main body 2, a screen 3 for displaying an image, and a support base 4 provided at a lower portion of the main body 2 to support the main body 2.

The main body 2 forms an outer shape of the display apparatus 100 and components (not shown) for displaying an image on the screen 3 may be provided inside the main body 2, For example, a board, on which a processor for determining an operating mode of the display apparatus 100, a processor provided to detect the genre of a game executed in the display apparatus 100 when the display apparatus 100 operates in a game mode, a processor for processing a video signal for an image provided to the display apparatus 100 according to the genre of a game, and the like are mounted, may be provided inside the main body 2. The main body 2 shown in FIGS. 1 and 2 is in the form of a flat plate, but the shape of the main body 2 is not limited to that shown in FIG. 1. For example, the main body 2 may have a shape in which the left and right ends protrude forward and the center portion is curved so as to be concave.

The screen 3 is formed on a front surface of the main body 2, and an image, which is visual information, may be displayed on the screen 3. For example, a still image or a moving image may be displayed on the screen 3, and a two-dimensional plane image or a three-dimensional image may be displayed on the screen 3.

A plurality of pixels is formed on the screen 3, and an image displayed on the screen 3 may be formed by a combination of light emitted from the plurality of pixels. For example, an image I may be formed on the screen 3 by combining the light emitted by a plurality of pixels P as a mosaic.

Each of the plurality of pixels P may emit light of various brightness and various colors. In order to emit light of various brightness, each of the plurality of pixels may include a configuration (for example, an organic light emitting diode) capable of emitting light directly, or may include a configuration (for example, a liquid crystal panel) capable of transmitting or blocking light emitted by a backlight unit or the like.

The screen 3 may be provided in a flat plate shape as shown in FIG. 1. However, the shape of the screen 3 is not limited to that shown in FIG. 1, and may be formed in a shape in which both ends protrude forward and the center portion is curved so as to be concave according to the shape of the main body 2.

The support base 4 may be provided at a lower portion of the main body 2 so that the main body 2 may stably maintain its position on a floor. Alternatively, the support base 4 may be provided on the rear surface of the main body 2 so that the main body 2 may be firmly fixed to a wall surface.

Figure 3:
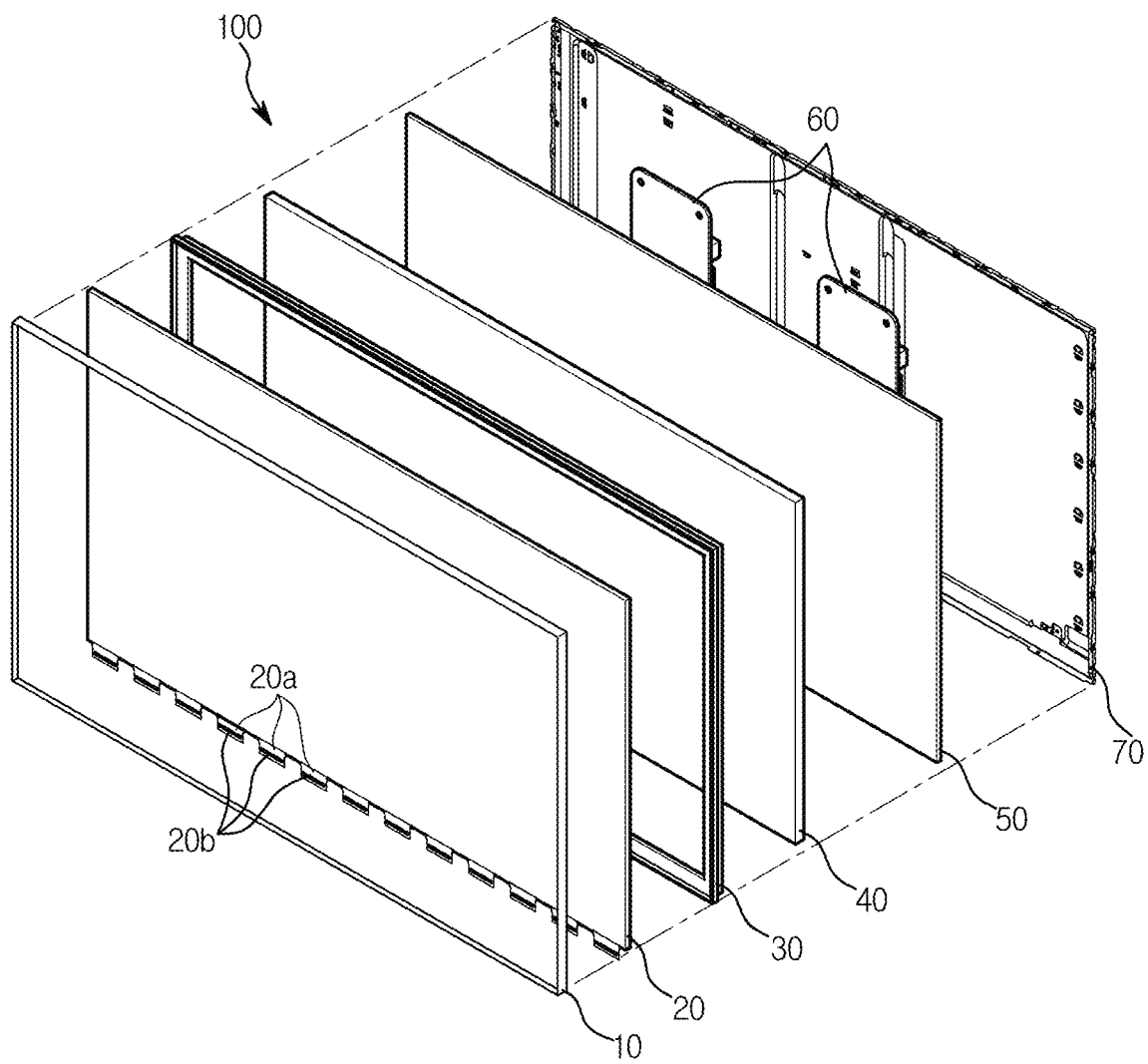
FIG. 3 is an exploded perspective view of a display apparatus according to an embodiment of the present disclosure.

FIG. 3 is an exploded perspective view of a display apparatus according to an embodiment of the present disclosure. As shown in FIG. 3, various components for generating an image on the screen 3 may be provided inside the main body 2.

For example, a backlight unit 40 for emitting a surface light forward, a liquid crystal panel 20 for blocking or transmitting light emitted from the backlight unit 40, and a power supply/control unit 60 for controlling operations of the backlight unit 40 and the liquid crystal panel 20 are provided in the main body 2.

In addition, a bezel 10, a frame middle mold 30, a bottom chassis 50, and a rear cover 70, which are components for supporting and fixing the liquid crystal panel 20, the backlight unit 40 and the power supply/control unit 60, are further provided in the main body 2.

The backlight unit 40 may include a point light source that emits monochromatic light or white light, and may refract, reflect, and scatter light to convert the light emitted from the point light source into a surface light. For example, the backlight unit 40 may include a light source that emits monochromatic light or white light, a light guide plate on which light is incident from the light source and for diffusing incident light, a reflective sheet for reflecting the light emitted from the rear surface of the light guide plate, and an optical sheet for refracting and scattering the light emitted from the front surface of the light guide plate.

As such, the backlight unit 40 may emit a uniform surface light source toward the front by refracting, reflecting, and scattering the light emitted from the light source.

The liquid crystal panel 20 is provided in front of the backlight unit 40 to block or transmit light emitted from the backlight unit 40 to form an image.

The front surface of the liquid crystal panel 20 forms the screen 3 of the display apparatus 100 described above and may be composed of the plurality of pixels P. The plurality of pixels P included in the liquid crystal panel 20 may independently block or transmit the light of the backlight unit 40, and the light transmitted by the plurality of pixels P may form an image to be displayed on the display apparatus 100.

Figure 4:
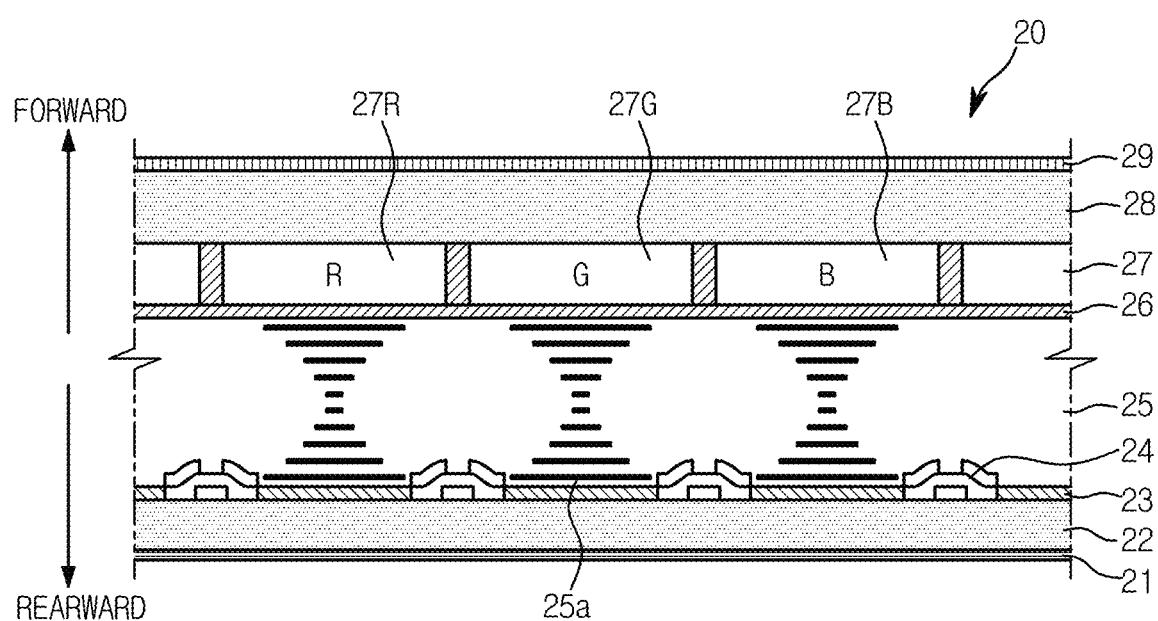
FIG. 4 illustrates an example of a liquid crystal panel included in a display apparatus according to an embodiment of the present disclosure.

FIG. 4 illustrates an example of a liquid crystal panel included in a display apparatus according to an embodiment of the present disclosure. Referring to FIG. 4, the liquid crystal panel 20 may include a first polarizing film 21, a first transparent substrate 22, pixel electrodes 23, thin film transistors (TFT) 24, a liquid crystal layer 25, a common electrode 26, a color filter 27, a second transparent substrate 28, and a second polarizing film 29.

The first transparent substrate 22 and the second transparent substrate 28 may fixedly support the pixel electrodes 23, the thin film transistors 24, the liquid crystal layer 25, the common electrode 26 and the color filter 27. The first and second transparent substrates 22 and 28 may be made of tempered glass or transparent resin.

The first polarizing film 21 and the second polarizing film 29 are provided on the outer sides of the first and second transparent substrates 22 and 28. The first polarizing film 21 and the second polarizing film 29 may transmit specific light and block different light, respectively.

The light may be formed with a pair of an electric field and a magnetic field that oscillate in a direction orthogonal to the traveling direction. The electric field and the magnetic field constituting the light may oscillate in all directions orthogonal to the traveling direction of light, and the oscillation direction of the electric field and the oscillation direction of the magnetic field may be orthogonal to each other.

For example, the first polarizing film 21 transmits light having a magnetic field that oscillates in a first direction and blocks other light, and the second polarizing film 29 transmits light having a magnetic field that oscillates in a second direction and blocks other light. In this case, the first direction and the second direction may be orthogonal to each other. That is, the polarizing direction of the light transmitted by the first polarizing film 21 and the oscillating direction of the light transmitted by the second polarizing film 29 are orthogonal to each other. As a result, the light cannot generally pass the first polarizing film 21 and the second polarizing film 29 at the same time.

The color filter 27 may be provided on an inner side of the second transparent substrate 28. The color filter 27 may include a red filter 27R for transmitting red light, a green filter 27G for transmitting green light, and a blue filter 27B for transmitting blue light, and the red filter 27R, the green filter 27G and the blue filter 27B may be arranged in parallel with each other. In addition, the corresponding region in which the color filter 27 is formed may be provided to correspond to the pixels P described above.

The thin film transistors (TFT) 24 may be provided on an inner side of the first transparent substrate 22. For example, the thin film transistors 24 may be provided at positions corresponding to the boundaries of the red filter 27R, the green filter 27G, and the blue filter 27B.

The thin film transistors 24 may pass or block the current flowing to the pixel electrodes 23, which will be described below. For example, an electric field may be formed or removed between the pixel electrodes 23 and the common electrode 26 in accordance with the turning on (closing) or turning off (opening) of the thin film transistors 24.

The thin film transistors 24 may be formed of polysilicon, and may be formed by a semiconductor process such as lithography, deposition, and ion implantation.

The pixel electrodes 23 may be provided on an inner side of the first transparent substrate 22, and the common electrode 26 may be provided on an inner side of the second transparent electrode 28.

The pixel electrodes 23 and the common electrode 26 may be made of a metal material through which electricity is conducted, and may generate an electric field for changing the arrangement of liquid crystal molecules 25a constituting the liquid crystal layer 25, which will be described below.

The pixel electrodes 23 may be formed in regions corresponding to the red filter 27R, the green filter 27G and the blue filter 27B, and the common electrode 26 may be formed on the entire liquid crystal panel 20. As a result, an electric field may be selectively formed at the liquid crystal layer 25 depending on the positions of the pixel electrodes 23.

The pixel electrodes 23 and the common electrode 26 may be made of a transparent material and may transmit light incident from the outside. For example, the pixel electrodes 23 and the common electrode 26 may be formed of indium tin oxide (ITO), indium zinc oxide (IZO), silver nano wire, carbon nano tube (CNT), graphene, or PEDOT (3,4-ethylenedioxythiophene).

The liquid crystal layer 25 is formed between the pixel electrodes 23 and the common electrode 26, and is filled with the liquid crystal molecules 25a.

The liquid crystal represents an intermediate state between a solid (crystal) and a liquid. In general, when a solid material is heated, the state changes from a solid state to a transparent liquid state at the melting temperature. On the other hand, when heat is applied to a liquid crystal material in a solid state, the liquid crystal material changes to a transparent liquid state after changing to an opaque and cloudy liquid at the melting temperature. Most of the liquid crystal materials are organic compounds, their molecules have a long and narrow rod shape, and the arrangement of the molecules may have an irregular shape in some directions, but may have a regular shape in other directions. As a result, the liquid crystal has both the fluidity of liquid and optical anisotropy of crystal (solid).

The liquid crystal may also exhibit optical properties depending on the change of the electric field. For example, the direction of the molecular arrangement constituting the liquid crystal may change depending on the change of the electric field, When an electric field is generated in the liquid crystal layer 25, the liquid crystal molecules 25a of the liquid crystal layer 25 may be arranged according to the direction of the electric field, and when an electric field is not generated in the liquid crystal layer 25, the liquid crystal molecules 25a may be arranged irregularly or arranged along an alignment film (not shown).

As a result, the optical properties of the liquid crystal layer 25 may change depending on the presence or absence of an electric field passing through the liquid crystal layer 25. For example, when an electric field is not formed in the liquid crystal layer 25, light polarized by the first polarizing film 21 may pass through the second polarizing film 29 after passing through the liquid crystal layer 25 due to the arrangement of the liquid crystal molecules 25a of the liquid crystal layer 25. On the other hand, when an electric field is formed in the liquid crystal layer 25, the arrangement of the liquid crystal molecules 25a of the liquid crystal layer 25 changes so that light polarized by the first polarizing film 21 does not pass through the second polarizing film 29.

The power supply/control unit 60 may include a power supply circuit for supplying power to the backlight unit 40 and the liquid crystal panel 20, and a control circuit for controlling operations of the backlight unit 40 and the liquid crystal panel 20.

The power supply circuit may supply power to the backlight unit 40 so that the backlight unit 40 may emit a surface light and may supply power to the liquid crystal panel 20 so that the liquid crystal panel 20 may transmit or block light.

The control circuit may control the backlight unit 40 to regulate the intensity of the light emitted by the backlight unit 40 and may control the liquid crystal panel 20 so that an image is displayed on the screen 3.

For example, the control circuit may control the liquid crystal panel 20 to display an image based on the video signals received from content sources. Each of the plurality of pixels P included in the liquid crystal panel 20 transmits or blocks light according to the image data of the control circuit, so that an image is displayed on the screen 3.

The power supply/control unit 60 may be implemented with a printed circuit board and various circuits mounted on the printed circuit board. For example, the power supply circuit may include a capacitor, a coil, a resistance element, a microprocessor, etc., and a power supply circuit board on which the elements are mounted. Further, the control circuit may include a memory, a microprocessor, and a control circuit board on which the elements are mounted.

Cables 20a for transferring image data from the power supply/control unit 60 to the liquid crystal panel 20 and display driver integrated circuits (DDI) 20b (hereinafter, referred to as 'display drive unit') are provided between the liquid crystal panel 20 and the power supply/control unit 60.

The cables 20a may electrically connect between the power supply/control unit 60 and the display drive units 20b and electrically connect between the display drive units 20b and the liquid crystal panel 20.

The display drive units 20b may receive image data from the power supply/control unit 60 via the cables 20a and transmit the image data to the liquid crystal panel 20 via the cables 20a.

The structure of the display apparatus 100 has been described above. Next, the operation principle of the display apparatus 100 will be described based on the structure of the display apparatus 100 described above.

The display apparatus 100 according to an embodiment of the present disclosure is configured to, when a game is performed through the display apparatus 100, automatically change a display setting according to the genre of the game when a game content playback selection is input and to restore the changed display setting when the game content playback selection is canceled. Specifically, the display apparatus 100 is configured to automatically determine the genre of a game based on image feature information including at least one of the motion of the object included in an image and the depth of the image and to change the display setting so as to be suitable for the determined genre of the game. Herein, the cancellation of the game content playback selection may include canceling the game content playback selection by at least one of the case where the input source of the game content is changed and the connection is changed to other signal source, the case where the power of the display apparatus is turned off and the standby state is maintained for a predetermined time or more, and the case where the setting for each genre of the game mode is canceled by the input of a user.

To this end, the display apparatus 100 according to an embodiment includes an input unit for receiving a game content playback selection, and a controller configured to receive image information on game contents according to an input, derive feature information of an image including at least one of motion and depth of the image based on the received image information, determine the game genre for the image, change and provide the display setting of a screen being provided based on the determined game genre, and to restore the changed display setting when the game content playback selection is canceled. Also, according to an embodiment, the display apparatus 100 further includes an image display unit provided to switch a screen provided on a display to a screen reflecting characteristics of the determined game genre and restore the screen in accordance with a predetermined condition.

With the above configuration, the display apparatus 100 may automatically analyze the genre of a game based on the characteristics of a game content image. In addition, the display apparatus 100 may change the picture quality and the driving setting adaptively to an input source by changing the display setting based on the analyzed result, and may improve the convenience of a user by automatically providing a game mode suitable for the genre of the game to be executed.

Hereinafter, the detailed configuration and operation principle of the display device 100 will be described more specifically with reference to the accompanying drawings.

Figure 5:
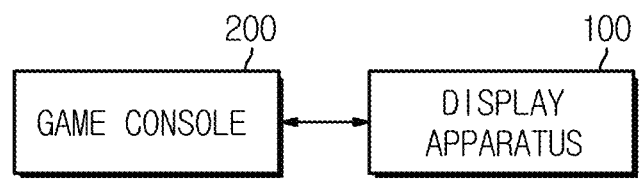
FIG. 5 is a control block diagram of a display apparatus according to an embodiment of the present disclosure.
Figure 6:
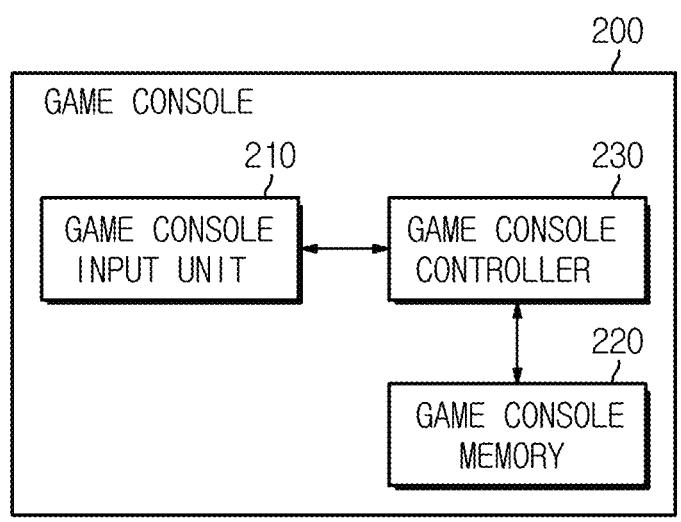
FIG. 6 is a detailed control block diagram of a game console configured to provide a game to a display apparatus.
Figure 7:
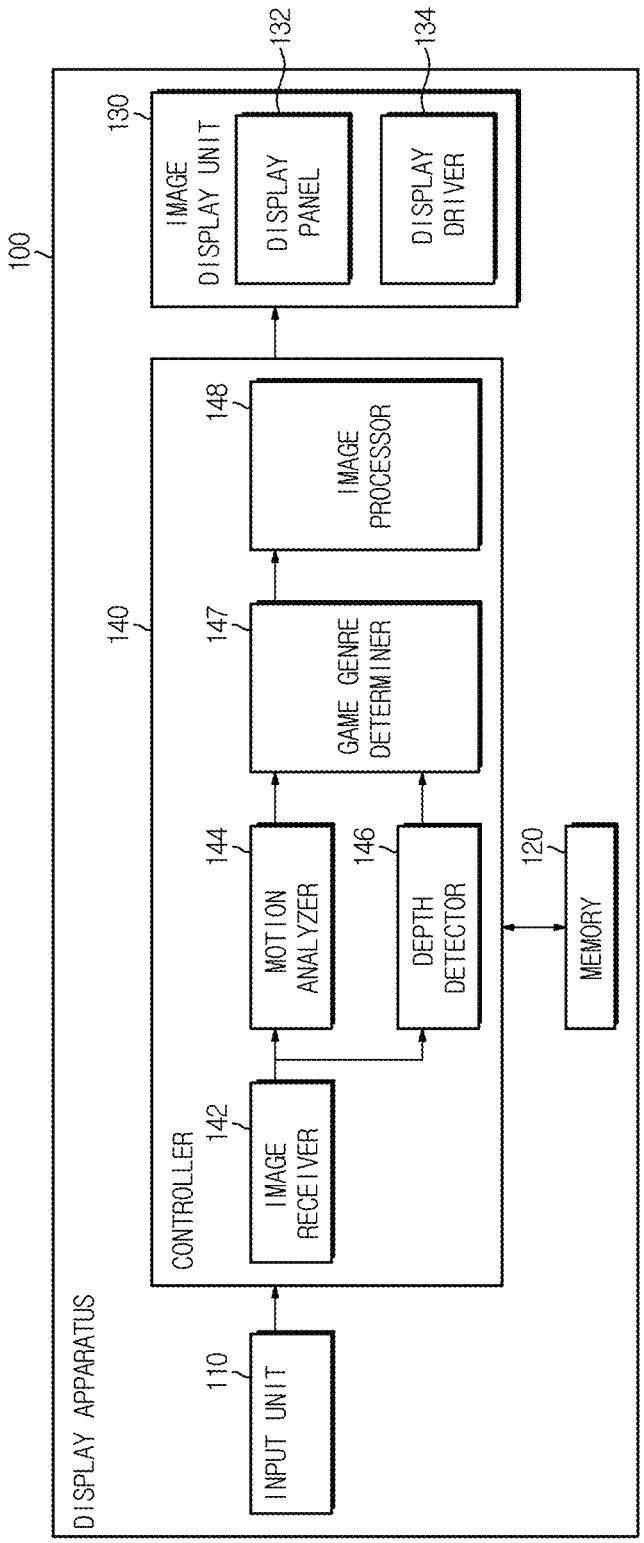
FIG. 7 is a detailed control block diagram of a display apparatus according to an embodiment of the present disclosure.

FIG. 5 is a control block diagram of a display apparatus according to an embodiment of the present disclosure, FIG. 6 is a detailed control block diagram of a game console configured to provide a game to a display apparatus, and FIG. 7 is a detailed control block diagram of a display apparatus according to an embodiment of the present disclosure.

Referring to FIG. 5, the display apparatus 100 according to an embodiment is provided to be connected to the game console 200.

The game console 200 refers to a video game machine which is a type of computer optimized for games, and more specifically to an electronic device using an image display signal such as a composite video of the display apparatus 100 or the like. The game console 200 may be connected to the display apparatus 100 in a wired manner through a dedicated cable according to the needs of a user, and may also be connected to the display apparatus 100 in a wireless manner according to an embodiment.

Referring to FIG. 6, the game console 200 includes an input unit 210, a memory 220, and a controller 230. In order to distinguish from an input unit 110, a memory 120, and a controller 140 that are components of the display apparatus 100, which will be described later, hereinafter, the input unit 210, the memory 220, and the controller 230 of the game console 200 will be referred to as the game console input unit 210, the game console memory 220, and the game console controller 230, respectively.

The game console input unit 210 is provided to receive an operation command for operating a game from a user. The game console input unit 210 may include an input device optimized for games such as a game pad or a joystick, and may also include an input device such as a keyboard or a mouse according to an embodiment.

The game console memory 220 may store programs and data for controlling the game console 200 and temporarily store data generated while the game console 200 is being controlled.

The game console memory 220 may store programs and data for processing video signals and/or audio signals, and may temporarily store data generated during processing of the video signals and/or the audio signals.

The game console memory 220 may include a nonvolatile memory such as a ROM (Read Only Memory), a flash memory, an EPROM (Erasable Programmable Read Only Memory), and an EEPROM (Electrically Erasable Programmable Read Only Memory) for storing data for a long period of time; and a volatile memory such as an S-RAM (Static Random Access Memory) and a D-RAM (Dynamic Random Access Memory) for temporarily storing data.

The game console controller 230 controls the overall operation of the game console 200 and the signal flow between the internal components of the game console 200 and performs a function of processing data.

The game console controller 230 may execute a control program or an application stored in the game console memory 220 when a control command is input from a user or a preset condition is satisfied. For example, the preset condition may refer to a condition in which a disk, a ROM cartridge or the like storing game software is inserted into the game console 200 and the power of the game console 200 is switched to be turned on, but the present disclosure is not limited thereto.

The game console controller 230 may include a processor, a ROM for storing a control program or application for controlling the game console 200, and a RAM used as a storage area corresponding to various operations performed in the game console 200. Hereinafter, the ROM and the RAM of the game console controller 230 may be concepts including the ROM and the RAM of the game console memory 220.

The game console controller 230 may provide a game image to the display apparatus 100 to provide the game image of the game being played to a user.

Referring to FIGS. 5 and 7, the display apparatus 100 may include the input unit 110, the memory 120, and the controller 140, and the controller 140 may include an image receiver 142, a motion analyzer 144, a depth detector 146, a game genre determiner 147, and an image processer 148. According to an embodiment, the display apparatus 100 may further include an image display unit 130. FIG. 7 illustrates an example in which the image display unit 130 is provided integrally with the display apparatus 100. However, in some cases, the image display unit 130 may be independent of the display apparatus 100. Hereinafter, the functions of the respective components will be described in detail.

The input unit 110 is provided to receive a control command for controlling the display apparatus 100 from a user. The input unit 110 may receive an on/off command for the display apparatus 100 from a user and may receive a mode setting command for an operation mode of the display apparatus 100.

Hereinafter, the operation mode of the display apparatus 100 may be divided into a plurality of modes including a broadcast mode for providing broadcast contents and a game mode for executing a video game. The disclosure is characterized in that the display setting of the screen being provided by the display apparatus 100 is changed when the game content playback selection is input through the input unit 110 and the game genre for the game content being provided by the display apparatus 100 is determined and the changed display setting is restored when the game content playback selection is canceled. Hereinafter, an embodiment of the present disclosure will be described by exemplifying a case where the display apparatus 100 operates as a game mode.

The input unit 110 may be provided in the form of a push switch or a touch pad and may also be implemented as a touch screen panel (TSP) integrated with the image display unit 130 according to an embodiment of the present disclosure. Also, the input unit 110 may be a concept including a remote-control device, a user terminal, and the like, which are provided to control the display apparatus 100 remotely.

The memory 120 may store programs and data for controlling the display apparatus 100 and temporarily store data generated while the display apparatus 100 is being controlled.

The memory 120 may also store programs, applications, and data for providing a game so that the user may enjoy the game through the display apparatus 100 and may temporarily store data generated during the provision of the game.

The memory 120 may also determine the genre of the game that may be provided through the display apparatus 100 and may store a program for changing the display setting of the display apparatus 100 based on the determined genre. To this end, the memory 120 may store information on the genre of the game that may be provided through the display apparatus 100 and an image feature for each genre of the game. In addition, the memory 120 may store information on display settings suitable for each genre of the game, that is, information on image quality and drive settings suitable for each genre of the game.

The memory 120 may also store programs and data for processing video signals and/or audio signals and may temporarily store data generated during processing of the video signals and/or the audio signals.

The memory 120 may include a nonvolatile memory such as a ROM (Read Only Memory), a flash memory, an EPROM (Erasable Programmable Read Only Memory), and an EEPROM (Electrically Erasable Programmable Read Only Memory) for storing data for a long period of time; and a volatile memory such as an S-RAM (Static Random Access Memory) and a D-RAM (Dynamic Random Access Memory) for temporarily storing data.

The image display unit 130 includes a display panel 132 for visually displaying an image and a display driver 134 for driving the display panel 132.

The display panel 132 may generate an image according to the image data received from the display driver 134 and display the image.

The display panel 132 may include pixels serving as a unit for displaying an image. Each pixel may receive an electrical signal representative of an image from the display driver 134 and output an optical signal corresponding to the received electrical signal, As such, a plurality of pixels may be displayed on the one display panel 132 by combining the output optical signals.

The display panel 132 may be implemented as the liquid crystal panel 20 (refer to FIGS. 3 and 4) described with reference to FIGS. 3 and 4. However, the embodiment of the display panel 132 is not limited to the liquid crystal panel 20, but may be implemented by a light emitting diode (LED) panel and an organic light emitting diode (OLED).

The display driver 134 may receive image data from the controller 140 and may drive the display panel 132 to display an image corresponding to the received image data.

Specifically, the display driver 134 may transmit an electrical signal corresponding to the image data to each of the plurality of pixels constituting the display panel 132.

When the display driver 134 transmits an electrical signal corresponding to the image data to each pixel constituting the display panel 132, each pixel may output light corresponding to the received electrical signal, and each pixel may form one image by combining the outputted light.

The display driver 134 may be implemented as the display drive units 20b (refer to FIG. 2) described with reference to FIG. 2.

The controller 140 controls the overall operation of the display apparatus 100 and the signal flow between the internal components of the display apparatus 100 and performs a function of processing data.

The controller 140 may execute the control program or the application stored in the memory 120 of the display apparatus 100 when a control command is input from a user or a preset condition is satisfied.

Specifically, when the game console 200 is connected to the display apparatus 100 and the game content playback selection for executing the game mode is input through the input unit 110, the controller 140 may execute the control program or the application stored in the memory 120 of the display apparatus 100 to provide the game through the display apparatus 100.

When the game content playback selection is input through the input unit 110, the controller 140 may receive the game image necessary for executing the game from the game console 200 and may provide a game screen through the image display unit 130 of the display apparatus 100.

The image provided at the beginning of the game through the image display unit 130 is provided in accordance with a preset basic display setting. This image is an image that does not reflect the genre-specific characteristics of the game, and therefore it is necessary to change and provide the display setting for each genre of the game. Accordingly, the controller 140 determines the game genre by analyzing the image information on the game content received from the game console 200, and changes the display setting of the screen being provided to the display panel 132 and provides the changed display setting, based on the determined game genre. In addition, when the game content playback selection is canceled through the input unit 110, the controller 140 may restore and provide the changed display setting.

The disclosure relates to genre detection of game content being provided by the display apparatus 100, and determines the genre of a game on the basis of the difference of features of images provided for each game genre. Hereinafter, an example of classification of the game genre will be described for the sake of understanding.

First-person shooter (FPS) is a kind of shooting game in which a player fights with a weapon or a tool on the same screen as the player's viewpoint. The game images of the FPS genre are mainly produced in a 3D graphic manner in the players viewpoint. Examples of FPS genre games include Overwatch and Sudden Attack.

Racing is a kind of game that races on the same screen as the players viewpoint. The game images of the racing genre are mainly produced in a 3D graphic manner in the players viewpoint. Examples of racing genre games include Dirt Rally and Motorcycle Club.

RPG (Role Playing Game) is a kind of role playing game in which a player plays a character in a game. Examples of the RPG genre games include Lineage, Dungeon and Fighter, and other games that emphasize user interaction such as siege and party play while growing characters.

RTS (Real-Time Strategy) is a kind of strategy game that is played in real time. Games in the RTS genre generally follow the form of a strategy game that ends when you collect resources, build buildings, produce troops, develop civilizations, or win wars with the resources. Examples of RTS genre games include games like StarCraft.

AOS (Aeon of Strife) is a kind of game in which the characteristics of RTS and RPG are combined. Examples of AOS genre games include games like League of Legends (LOL).

The disclosure determines the genre of a game based on the fact that images having different features are provided for each genre of the game with respect to the genres of the games exemplified above. Hereinafter, the detailed components of the controller 140 for performing the above operation will be described.

The controller 140 may include the image receiver 142 configured to receive image information on game contents, the motion analyzer 144 configured to analyze a motion of an object included in the image based on the received image, the depth detector 146 configured to detect a depth of the received image, and the game genre determiner 147 configured to determine the game genre for an image based on output values of the motion analyzer 144 and the depth detector 146. In addition, the controller 140 may further include the image processor 148 configured to process an image provided through the display panel 132 to change and provide the display setting of a screen being provided according to the game genre determined by the game genre determiner 147.

The image receiver 142 of the controller 140 may be implemented through an input/output interface that mediates data input/output between various configuration devices included in the display apparatus 100 or between external devices (for example, the game console 200) connected to the display apparatus 100, the motion analyzer 144, the depth detector 146 and the game genre determiner 147 of the controller 140 may be implemented through a main processor that performs arithmetic operations according to programs and data stored in the memory 120, and the image processor 148 of the controller 140 may be implemented through a graphics processor that performs image processing. In addition, the controller 140 may include a system bus that is a path for transmitting and receiving data between the input/output interface, the memory, the main processor, and the graphic processor.

The image receiver 142 receives image information on the game from the application stored in the memory 120 of the display apparatus 100 or the game console 200 and transmits the received image information to the motion analyzer 144 and the depth detector 146.

The motion analyzer 144 and the depth detector 146 derive feature information of the image including at least one of motion and depth of the image based on the image received from the image receiver 142.

The motion analyzer 144 may include a motion prediction unit configured to predict the degree and magnitude of motion of an object included in an image based on a plurality of consecutively input images, and a feature information derivation unit configured to derive feature information of the image based on the predicted motion information.

The motion analyzer 144 may analyze the overall motion and the local motion of the images, and more specifically, analyze the direction and velocity of the overall motion and the local motion.

The depth detector 146 is configured to detect a depth of the received image based on depth cues including at least one of geometric information, luminance information, frequency information, and histogram distribution information of the image, and derive feature information of an image including at least one of a vanishing point, a horizontal line, and a composition of an object.

Figure 8:
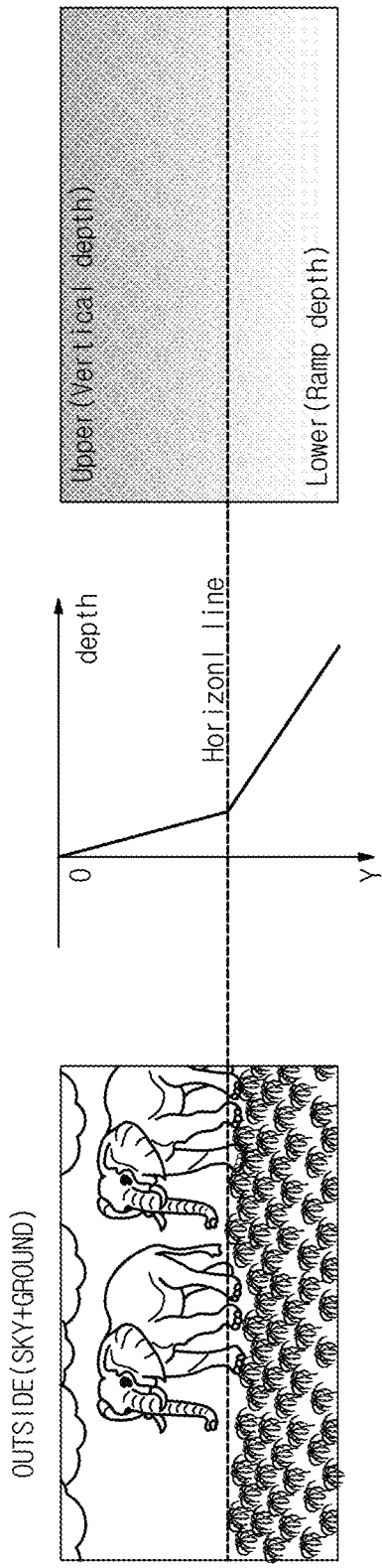
FIGS. 8 and 9 are views illustrating examples in which a depth detector uses luminance information and geometric information of an image as depth dues.
Figure 9:
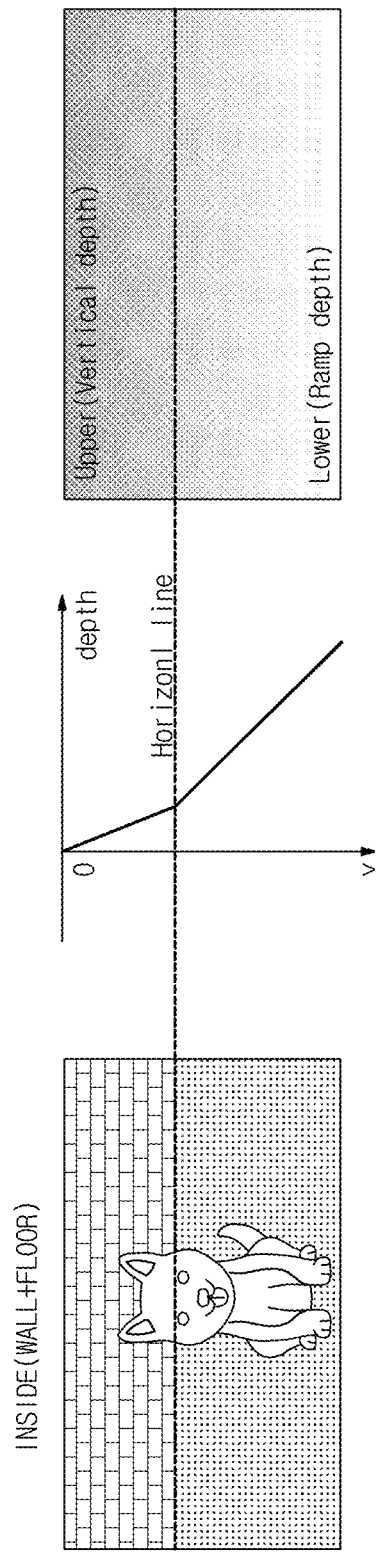

FIGS. 8 and 9 are views illustrating examples in which a depth detector uses luminance information and geometric information of an image as depth clues.

Referring to FIGS. 8 and 9, the depth detector 146 may distinguish the inside and the outside of the image by using luminance information of the image as a depth clue. However, the method of distinguishing between the inside and outside of the image is not limited thereto. According to an embodiment, when a preset first color (for example, a blue-based color) is mainly distributed at an upper side of a horizontal line and a preset second color (for example, a green or black-based color) is mainly distributed at a lower side of the horizontal line, the depth detector 146 may recognize that the space provided to the image is the outside by using the histogram information and the geometric information on the color of the image, and when the above conditions are not satisfied, the depth detector 146 may recognize that the space provided to the image is the inside.

Then, the depth detector 146 may use the geometric information as a depth clue to detect a horizontal line portion of the image, and determine the horizontal line portion as a distant view. According to an embodiment, the depth detector 146 may also detect a vanishing point if the image includes the vanishing point, and determine the portion as a distant view.

Figure 10:
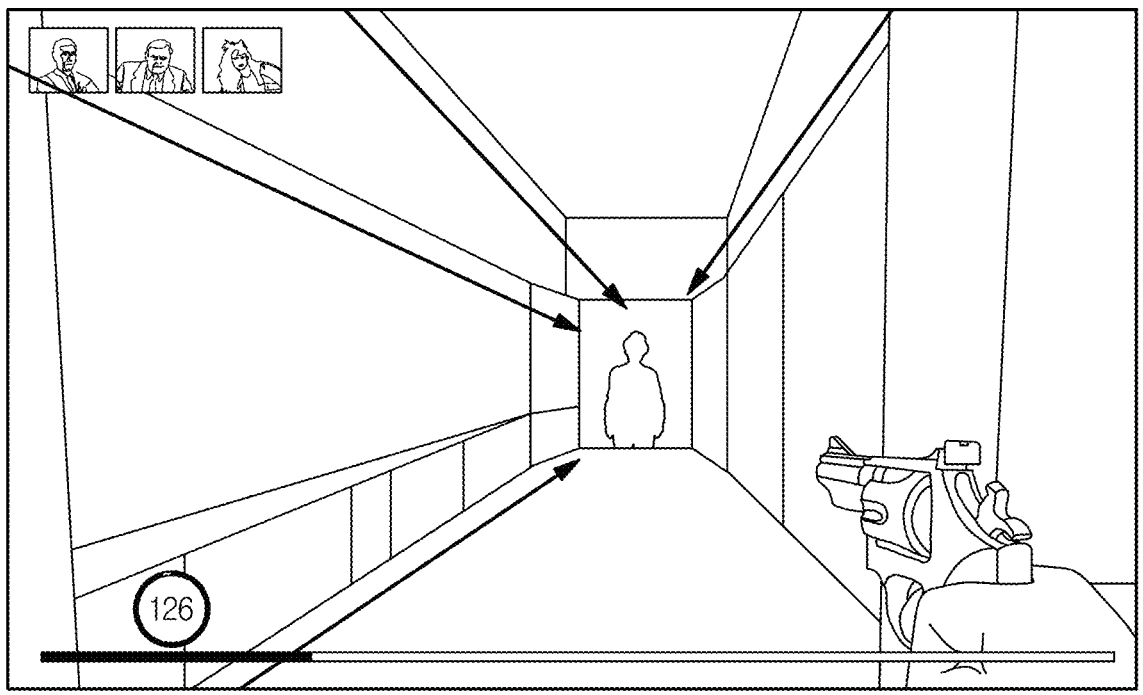
FIGS. 10 and 11 are views illustrating other examples in which a depth detector uses geometric information of an image as a depth clue.
Figure 11:
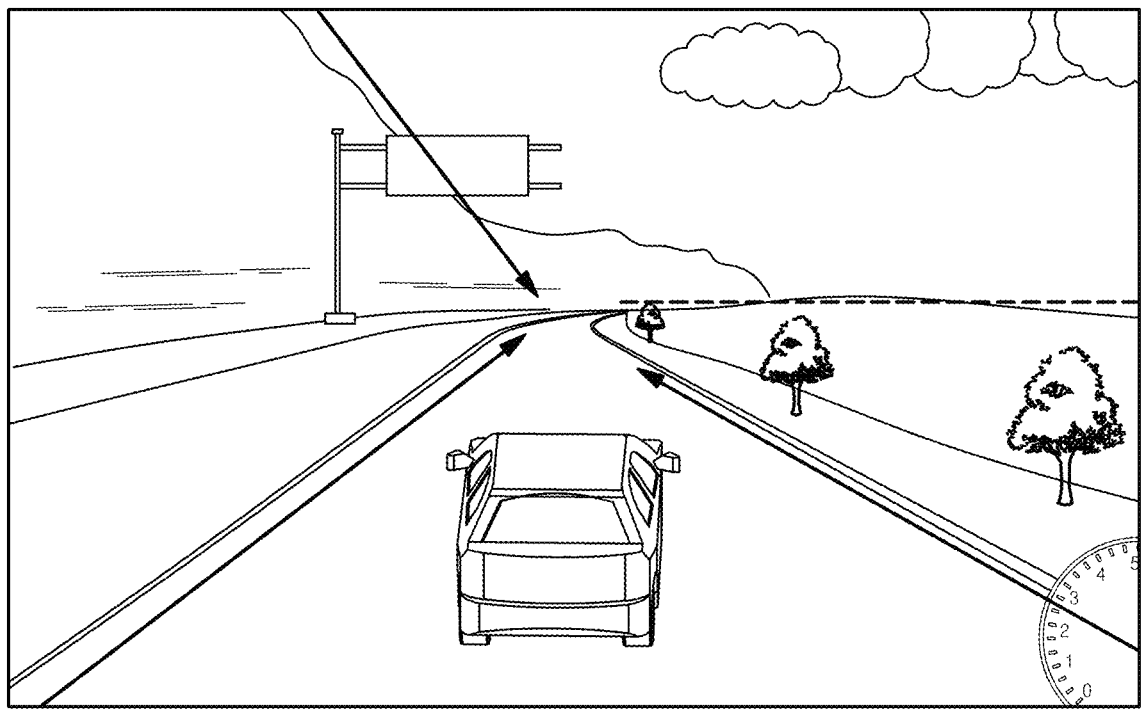

FIGS. 10 and 11 are views illustrating other examples in which a depth detector uses geometric information of an image as a depth clue.

Referring to FIG. 10, the depth detector 146 may detect the vanishing point of an image using the geometric information of the image as the depth clue and determine the vanishing point portion as a distant view.

Referring to FIG. 11, the depth detector 146 may detect the vanishing point and the horizontal line of an image using the geometric information as a depth clue, and determine the vanishing point and the horizontal line portion as a distant view. FIG. 11 shows a leader line for deriving the vanishing point as a solid line and the horizontal line as a dotted line in order to distinguish the horizontal line from the leader line for deriving the vanishing point.

When the depth detector 146 uses the luminance information of an image as a depth clue, if the luminance is mainly distributed in a central portion of the image and a lower portion of the center, the depth detector 146 may determine the image as a close-range view. More specifically, the depth detector 146 may distinguish the luminance between the background and the foreground object through the overall luminance distribution analysis of the image, and designate a high depth for fractional distribution gradations through the luminance distribution analysis in a local area unit.

When the depth detector 146 uses the frequency information of an image as a depth clue, a corresponding portion is focused if the frequency of the image is equal to or higher than a preset first frequency, and thus the depth detector 146 may determine the corresponding portion as a close-range view, while a corresponding portion is not focused if the frequency of the image is less than the preset first frequency, and thus the depth detector 146 may determine the corresponding portion as a distant view.

When the depth detector 146 uses the histogram distribution information of an image as a depth clue, the depth detector 146 may derive feature information of the image based on the histogram information on the color, motion, etc. of the image.

As an example, the depth detector 146 may use the histogram distribution information on the motion of the images to determine a corresponding object as a dose-range view if the motion of the object included in the images is equal to or higher than a preset first speed, and may determine the corresponding object as a distant view if the motion of the object is less than the preset first speed.

The resultant value analyzed by the motion analyzer 144 and the resultant value derived from the depth detector 146 are transmitted to the game genre determiner 147 and provided to the process in which the game genre determiner 147 determines the game genre for an image.

The game genre determiner 147 determines the game genre for an image based on the output values of the motion analyzer 144 and the depth detector 146. Specifically, the game genre determiner 147 determines the game genre for the image based on feature information of the image including the direction and velocity information about the overall motion and the local motion of the image derived by the motion analyzer 144 and feature information of the image including at least one of the vanishing point, the horizontal line, and the composition of an object detected by the depth detector 146.

Hereinafter, for the sake of understanding, a method for determining the game genre for the images based on the type of feature information of the image to be considered for each game genre and the corresponding feature information to determine the game genre for the image in the game genre determiner 147 will be described.

The following description is only an example of a method for determining the game genre in the game genre determiner 147, and the technical idea of the present disclosure is not limited by the examples described below. In other words, the feature information of the image to be considered when determining the game genre in the game genre determiner 147 may be added or removed in such a manner that the software is upgraded according to the intention of the designer.

The feature information of the image to be considered for each game genre to determine the game genre for the images in the game genre determiner 147 is as follows.

In the FPS and racing game genres, as shown in FIG. 9, a vanishing point exists, and a foreground object exists at a lower portion with respect to a central region of the image. Also, in the FPS game genre, there is a lot of fast panning motion, whereas in the racing game, the panning motion is slight but has a certain depth and the movement of the vanishing point tends to be smooth.

In the RPG game genre, the transition of images is fast and does not tend to maintain a constant pattern, and in the RTS game genre, there is a large difference in depth between the images as a whole and the panning motion tends to be detected frequently. In the AOS game genre, images appear as a combination of image features of the RPG game genre and the RTS game genre.

The game genre determiner 147 may determine the game genre for the images in consideration of the above characteristics.

First, if it is detected that there is a vanishing point in the image, a foreground object exists in a lower portion based on a center region of the image, and a fast panning motion is detected, the game genre determiner 147 may determine that it is the FPS game genre.

Also, if it is detected that there is a vanishing point in the image, a foreground object exists in a lower portion based on a center region of the image, the panning motion is slight but has a certain depth and the movement of the vanishing point tends to be smooth, the game genre determiner 147 may determine that it is the racing game genre.

Also, if the transition to the image features of the images is fast and does not tend to maintain a constant pattern, the game genre determiner 147 may determine that it is the RPG game genre.

Also, if there is not a large difference in depth between the images as a whole and the panning motion tends to be detected frequently, the game genre determiner 147 may determine that it is the RTS game genre.

Also, if the transition to the image features of the images is fast, there is not a large difference in depth between the images as a whole and the panning motion tends to be detected frequently, the game genre determiner 147 may determine that it is the AOS game genre.

The game genre determiner 147 may consider the following factors in the process of determining the game genre for the images.

The game genre determiner 147 may determine the game genre as the game genre for the images if the genre-specific characteristics of the images satisfy a preset time or frequency. For example, when the feature of the images determined for a plurality of consecutively inputted images accords with the feature of a specific game genre for a preset time or the feature of the images for a preset number of images among a plurality of consecutively inputted images accords with the feature of the image for a specific game genre, the game genre determiner 147 may determine the game genre for the images as the specific game genre.

The image processor 148 processes the image so as to be suitable for the game genre determined by the game genre determiner 147. More specifically, before the game genre is determined by the game genre determiner 147, the image processor 148 processes the image according to a basic setting, and when the game genre for the image is determined by the game genre determiner 147, the image processor 148 processes the image so as to be suitable for the determined game genre.

For example, since it is necessary to find an enemy quickly in the FPS game genre so that the probability of winning is high, and a quick manipulation reaction is required to accomplish the task in the racing game, the image processor 148 may perform fast image processing on the images of the game genres.

Also, since it is important to find an enemy existing in a dark portion of a map early in the RTS game genre, the image processor 148 may perform image processing for enhancing the visibility of a boundary between the bright portion and the dark portion of the map.

Also, since the RPG game genre has many brilliant scenes, the image processor 148 may perform image processing for enhancing sharpness and contrast with respect to the image.

The above-described image processing method describes merely examples of the image processing method of the image processor 148, and the technical idea of the present disclosure is not limited by the above-described examples.

The structure and operation principle of the display apparatus 100 according to an embodiment have been described above. Hereinafter, a control method of the display apparatus 100 according to an embodiment will be described based on the above description.

Figure 12:
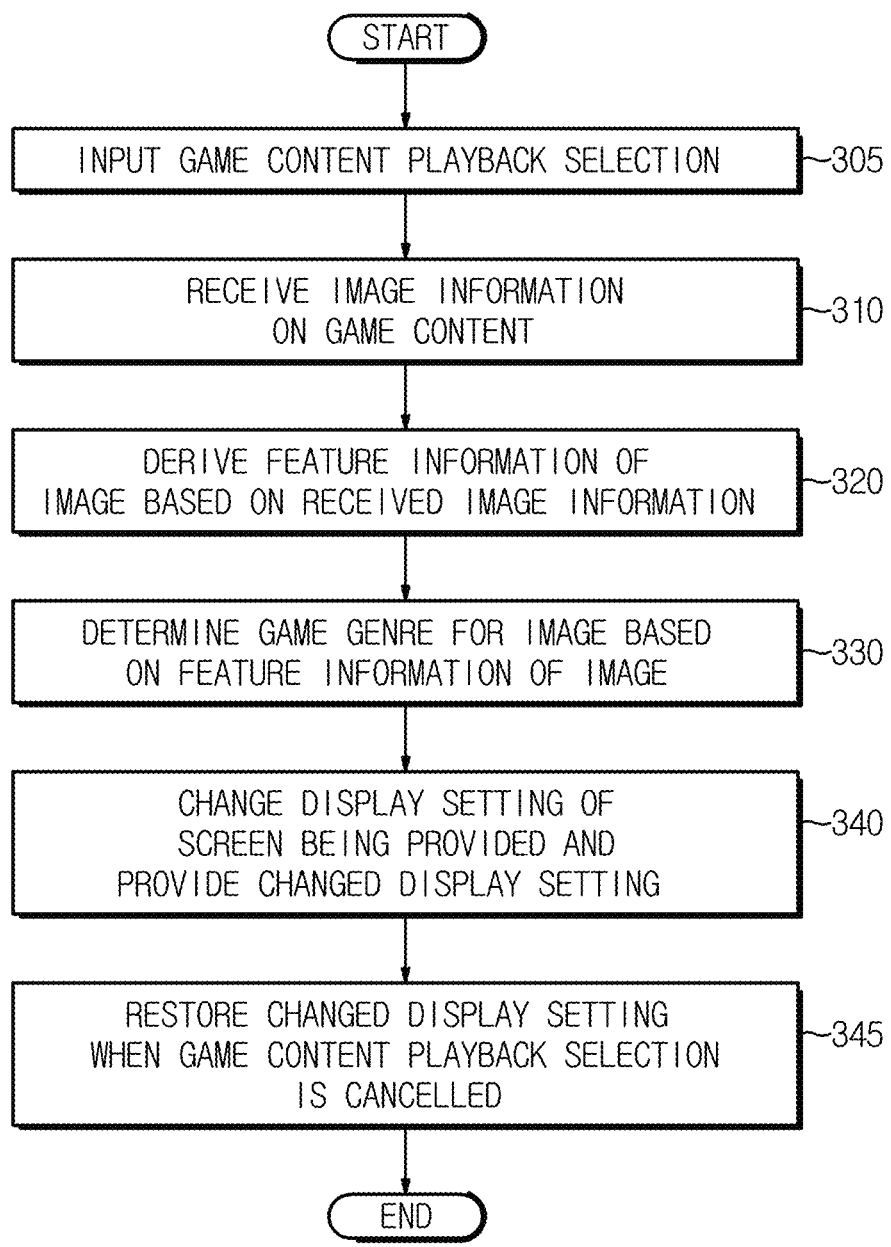
FIG. 12 is a flowchart illustrating a control process of a display apparatus according to an embodiment of the present disclosure.
Figure 13:
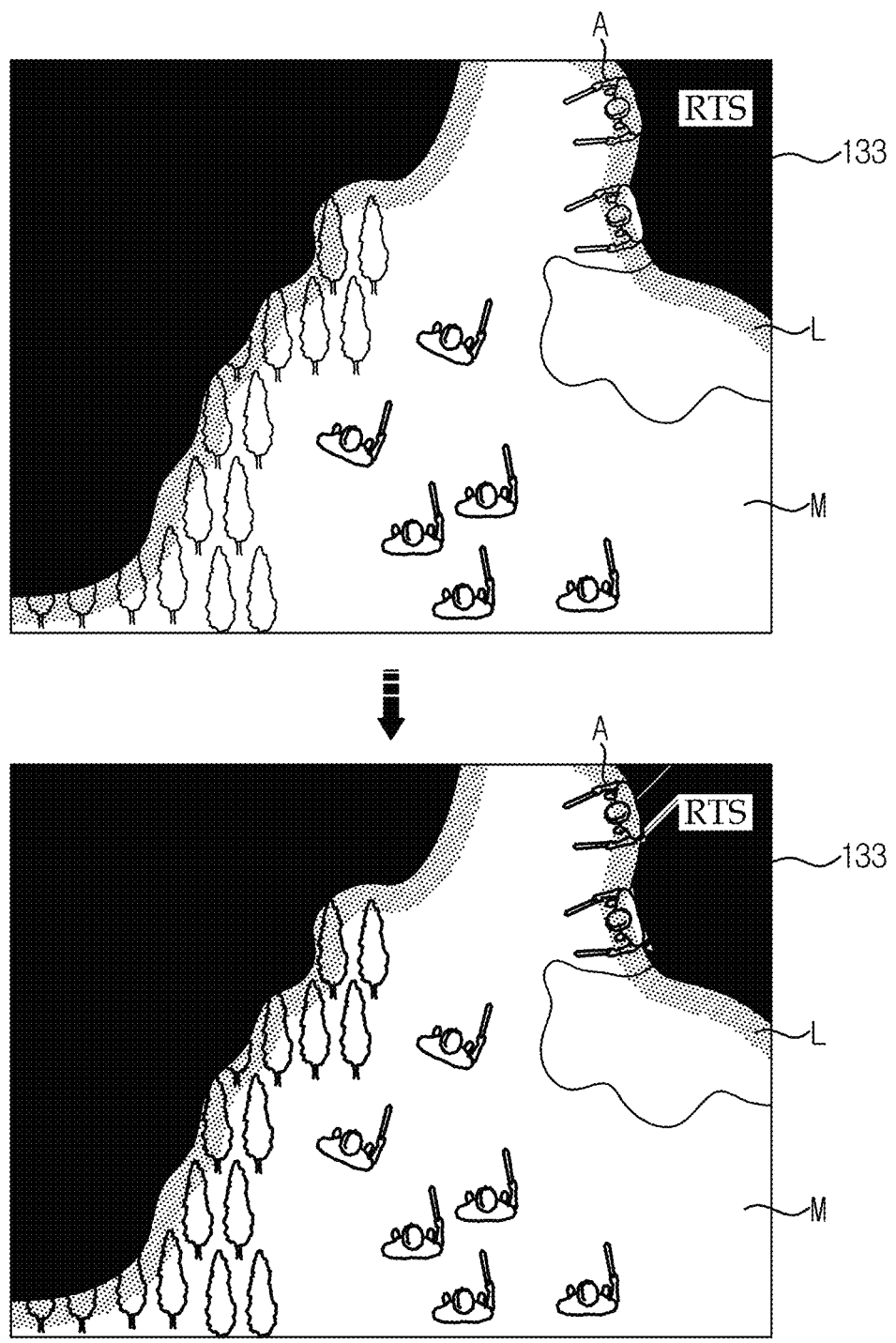
FIG. 13 is a view for explaining a method of switching a display screen during the control process of the display apparatus according to FIG. 12.

FIG. 12 is a flowchart illustrating a control process of a display apparatus according to an embodiment of the present disclosure, and FIG. 13 is a view for explaining a method of switching a display screen during the control process of the display apparatus according to FIG. 12.

Referring to FIG. 12, the control process of the display apparatus 100 according to an embodiment includes receiving a game content playback selection (305), receiving image information on game content (310), deriving feature information of the image including at least one of the motion and the depth of the image based on the received image information (320), determining the game genre for the image based on the feature information of the image (330), changing and providing the display setting of the screen being provided when the game genre for the image is determined (340), and restoring the changed display setting when the game content playback selection is canceled (345).

First, the input unit 110 receives the playback selection for the game content from a user and outputs an input signal to the controller 140 (305).

When the playback selection for the game content is input by the user, receiving of the image information for the game content is performed (310). The receiving of the image information for the game content may include receiving image information for the game content from the game console 200 connected to the display apparatus 100 or an application stored in the memory 120 of the display apparatus 100. Herein, the application stored in the memory 120 refers to an application stored in the memory 120 of the display apparatus 100 for executing a game and may be a concept including a pre-stored application and an application downloaded from the outside.

Next, a process of deriving feature information of the image including at least one of the motion and the depth of the image based on the received image information is performed (320).

First, the motion analyzer 144 of the controller 140 may analyze the overall motion and the local motion of the images based on the received images. More specifically, the motion analyzer 144 may derive the feature information of the images including the direction and velocity of the overall motion and the local motion.

Also, the depth detector 146 of the controller 140 may detect the depth of the received image based on a depth clue including at least one of geometric information, luminance information, frequency information, and histogram distribution information of the image, and may derive the feature information of the image including at least one of a vanishing point, a horizontal line, and a composition of an object.

Next, a process of determining the game genre for the image is performed based on the feature information of the image (330).

The determining of the game genre for the image based on the feature information of the image includes determining the game genre for the image based on the feature information of the image received in the game genre determiner 147 from the motion analyzer 144 and the depth detector 146.

For example, the game genre determiner 147 may determine the game genre for the image based on the feature information of the image including the direction and velocity information of the overall motion and the local motion of the image derived from the motion analyzer 144 and the feature information of the image including at least one of the vanishing point, the horizontal line, and the composition of an object detected from the depth detector 146.

Meanwhile, the process of determining the game genre for the image may consider the following factors. Specifically, when the feature of the images determined for a plurality of consecutively inputted images accords with the feature of a specific game genre for a preset time or the feature of the images for a preset number of images among a plurality of consecutively inputted images accords with the feature of the image for a specific game genre, the determining the game genre for the image based on the feature information of the image may include determining the game genre for the images to be a specific game genre.

Next, changing and providing the display setting of the screen being provided is performed (340). The changing and providing of the display setting of the screen being provided may include changing and providing the screen, which is being provided, to a preset display setting for the determined game genre. Specifically, before the game genre is determined by the game genre determiner 147, the image display unit 130 may provide a game screen image-processed according to a basic setting as shown on the left side of the arrow in FIG. 13, and when the game genre is determined by the game genre determiner 147, the image display unit 130 may provide a game screen image-processed so as to be suitable for the game genre as shown on the right side of the arrow in FIG. 13.

FIG. 13 shows the image processing result for the RTS game genre. It may be confirmed that the image processing for enhancing the visibility of a boundary L between the bright portion and the dark portion of a map M is performed so that an enemy A present in the dark portion of the map M is found early.

The image display unit 130 may also provide a game genre guidance for the game being provided by the display apparatus 100 in an area of the display screen as shown on the right side of the arrow in FIG. 13. FIG. 13 shows a case where the game genre for the image is determined to be the RTS genre, and a phrase such as RTS may be displayed on an upper right side of the display screen.

When changing and providing the display setting of the screen being provided, the display apparatus 100 may provide a window 133 that induces to change the screen, which is being provided to the image display unit 130, to a predetermined display setting for the set game genre and provide the changed display setting. The display apparatus 100 may change and provide the display setting by receiving a control command from the user through a window 133 button provided on the screen, and may provide a window 133 on the screen according to an embodiment and change the display setting after a preset time elapses.

Meanwhile, when the game content playback selection is canceled during the provision of the changed display screen based on the determined game genre, restoring and providing the changed display setting may be performed (345).

As is apparent from the above, the display apparatus can adaptively change the picture quality and the driving setting for an input source by automatically analyzing the genre of the game based on the characteristics of the input game content image information and changing the display setting based on the analyzed result. As a result, the display apparatus can improve the convenience of the user by automatically providing a game mode suitable for the genre of the game being played. Embodiments of the display apparatus and the control method thereof have been described above. Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
    an input unit configured to receive a playback selection of game content; and
    a controller configured to
        receive image information on the game content according to the received playback selection,
        derive feature information of an image, the feature information including at least one of a motion and a depth of an object included in the image based on the received image information,
        determine the game genre for the image based on the derived feature information,
        change and provide a display setting of a screen being provided based on the determined game genre, and
        restore the changed display setting when the game content playback selection is canceled,
        wherein the display setting includes at least one of image processing for enhancing sharpness and image processing for enhancing contrast of the image.

2. The display apparatus according to claim 1, further comprising an image display unit configured to change the display setting of the screen being provided and provide the changed display setting, based on the determined game genre.

3. The display apparatus according to claim 2, wherein the image display unit is configured to change the screen, which is being provided, to a predetermined display setting for the determined game genre and provide the changed display setting.

4. The display apparatus according to claim 1, wherein the controller is configured to receive image information on game contents from a game console or an application stored in the display apparatus.

5. The display apparatus according to claim 1, wherein the controller is configured to determine the game genre for the images as a specific game genre when a feature of the images determined for a plurality of consecutively inputted images accords with a feature of the specific game genre for a preset time.

6. The display apparatus according to claim 1, wherein the controller is configured to determine the game genre for the images as a specific game genre when a feature of the images for a preset number of images among a plurality of consecutively inputted images accords with a feature of the image for the specific game genre.

7. The display apparatus according to claim 2, wherein the image display unit is configured to provide a window that induces to change the screen, which is being provided, to a predetermined display setting for the determined game genre and provide the changed display setting, when the game genre for the image is determined.

8. The display apparatus according to claim 2, wherein the image display unit is configured to display a game genre guidance for the game content being provided on the screen in an area of the screen.

9. The display apparatus according to claim 1, wherein the controller includes:
    an image receiver configured to receive an image of game contents;
    a motion analyzer configured to analyze a motion of an object included in the image based on the received image;
    a depth detector configured to detect a depth of the received image; and a game genre determiner configured to determine the game genre for the image based on output values of the motion analyzer and the depth detector.

10. The display apparatus according to claim 9, wherein the motion analyzer includes:
a motion prediction unit configured to predict the degree and magnitude of motion of an object included in an image based on a plurality of consecutively inputted images; and
a feature information derivation unit configured to derive feature information of the image based on the predicted motion information.

11. The display apparatus according to claim 9,
wherein the depth detector is configured to detect a depth of the received image based on depth cues including at least one of geometric information, luminance information, frequency information, and histogram distribution information of the image, and derive feature information of an image including at least one of a vanishing point, a horizontal line, and a composition of an object.

12. The display apparatus according to claim 9, wherein the game genre determiner is configured to determine the game genre for the image based on feature information of the image including the direction and velocity information about an overall motion and a local motion of the image derived by the motion analyzer and feature information of the image including at least one of the vanishing point, the horizontal line, and the composition of an object detected by the depth detector.

13. The display apparatus according to claim 1, further comprising a memory to store types of game genres and feature information of images for each type.

14. The display apparatus according to claim 1, wherein the cancelling of the game content playback selection includes canceling the game content playback selection by at least one of when the input source of the game content is changed, when the power of the display apparatus is turned off, and when the setting for each genre of the game mode is canceled by the user.

15. A control method of a display apparatus comprising:
receiving a playback selection of game content;
receiving image information on the game content;
deriving feature information of an image, the feature information including at least one of a motion and a depth of an object included in the image based on the received image information;
determining the game genre for the image based on the derived feature information of the image, and changing and providing a display setting of a screen being provided based on the determined game genre; and
restoring the changed display setting when the game content playback selection is canceled,
wherein the display setting includes at least one of image processing for enhancing sharpness and image processing for enhancing contrast of the image.

16. The control method according to claim 15, wherein the changing and providing of the display setting of the screen being provided includes changing the screen, which is being provided, to a predetermined display setting for the determined game genre and providing the changed display setting.

17. The control method according to claim 15, wherein the receiving of the image information on the game content includes receiving image information on the game content from a game console or an application stored in the display apparatus.

18. A control method of a display apparatus comprising:
receiving a playback selection of game content;
receiving image information on the game content;
deriving feature information of an image, the feature information including at least one of a motion and a depth of an object included in the image based on the received image information;
determining the game genre for the image based on the derived feature information of the image, and changing and providing a display setting of a screen being provided based on the determined game genre; and
restoring the changed display setting when the game content playback selection is canceled,
wherein the determining of the game genre for the image based on the feature information of the image includes determining the game genre for the images as a specific game genre when a feature of the images determined for a plurality of consecutively inputted images accords with a feature of the specific game genre for a preset time or a feature of the images for a preset number of images among a plurality of consecutively inputted images accords with a feature of the image for the specific game genre.

19. The control method according to claim 15, further comprising: providing a window, when the game genre for the image is determined, that induces to change the screen, which is being provided, to a predetermined display setting for the determined game genre and provide the changed display setting; and
displaying a game genre guidance for the game content being provided on the screen in an area of the screen.

20. The control method according to claim 15, wherein the cancelling of the game content playback selection includes canceling the game content playback selection by at least one of the case where the input source of the game content is changed, the case where the power of the display apparatus is turned off, and the case where the setting for each genre of the game mode is canceled by the user.

* * * * *